(12) United States Patent
Kim

(10) Patent No.: US 8,543,938 B2
(45) Date of Patent: Sep. 24, 2013

(54) TERMINAL AND METHOD FOR DISPLAYING INFORMATION

(75) Inventor: Tae Hun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1120 days.

(21) Appl. No.: 12/038,631

(22) Filed: Feb. 27, 2008

(65) Prior Publication Data
US 2008/0222559 A1    Sep. 11, 2008

(30) Foreign Application Priority Data

Mar. 2, 2007 (KR) .................. 10-2007-0021032

(51) Int. Cl.
*G06F 13/00* (2006.01)
*G06F 15/00* (2006.01)

(52) U.S. Cl.
USPC .......................................... 715/785; 715/787

(58) Field of Classification Search
USPC .................. 715/781–784, 785–787, 761–763
See application file for complete search history.

(56) References Cited

U.S. PATENT DOCUMENTS

| | | | |
|---|---|---|---|
| 2003/0122787 A1* | 7/2003 | Zimmerman et al. | 345/173 |
| 2004/0003412 A1* | 1/2004 | Halbert | 725/112 |
| 2004/0008191 A1 | 1/2004 | Poupyrev et al. | |
| 2007/0027618 A1 | 2/2007 | Sands et al. | |
| 2008/0042984 A1 | 2/2008 | Lim et al. | |

FOREIGN PATENT DOCUMENTS

| | | |
|---|---|---|
| EP | 1758013 A | 2/2007 |
| EP | 1758013 A1 * | 2/2007 |
| EP | 1890223 A2 | 2/2008 |
| JP | 2003-512668 A | 4/2003 |
| JP | 2004-213512 A | 7/2004 |
| KR | 10-0781706 B1 | 11/2007 |
| WO | WO 01/29641 A2 | 4/2001 |
| WO | WO 0129641 A2 * | 4/2001 |

OTHER PUBLICATIONS

Ashkon Technology, "Stock Ticker Application Bar 2.10", 2006, XP002483479, Retrieved from the Internet Jun. 9, 2008: URL: http://www.allworldsoft.com/software/2-540-stock-ticker-application-bar.htm>.
Zytronic, "Touchscreen User Manual", Zytronic X-Y Controller (Serial and USB)—Issue 1, XP007916436, Nov. 17, 2006, pp. 1-51.

* cited by examiner

*Primary Examiner* — Cao "Kevin" Nguyen
(74) *Attorney, Agent, or Firm* — Birch, Stewart, Kolasch & Birch, LLP

(57) ABSTRACT

A method and terminal for displaying information whereby when information, which has been broadcast from a broadcast server, is received and scroll-displayed, previous information or subsequent information of the received information being scroll-displayed can be shifted to be displayed according to the direction of a sliding touch by the user. In addition, when the user wants to check previous or subsequent information of the information being scroll-displayed on the touch screen, he does not need to wait for until the corresponding content is scrolled back, namely, until the corresponding content is scrolled-displayed again, so the user convenience can be considerably improved.

25 Claims, 4 Drawing Sheets

TERMINAL AND METHOD FOR DISPLAYING INFORMATION

This nonprovisional application claims priority under 35 U.S.C. §119(a) on Patent Application No. 10-2007-0021032 filed in Republic of Korea on Mar. 2, 2007, the entire contents of which are hereby incorporated by reference.

BACKGROUND

1. Field of Invention

This document relates to a terminal, computer program product and method for displaying information.

2. Related Art

Conventional electronic devices comprise a touch screen that allows the user to directly touch the touch screen to enter a desired menu or information, which, thus, provides easy accessibility to information.

In case the electronic device is a mobile terminal that receives information, upon receiving information such as news items broadcast from a broadcasting server, the conventional mobile terminal displays the received information at an upper or lower end area on the touch screen in a scrolling manner.

In this case, if the user does not carefully watch the information being scroll-displayed, he may fail to catch the scrolled content and inevitably miss it, resulting in that the user cannot easily recognize the information such as the news items.

In addition, if the user wants to watch (or read) again the information which has been once scroll-displayed on the touch screen, he must wait for until the corresponding content is scrolled back.

SUMMARY

An aspect of this document is to provide a method, computer program product and terminal for displaying information whereby when information, which has been broadcast from a broadcast server, is received and scroll-displayed, previous information or subsequent information of the received information being scroll-displayed can be shifted to be displayed according to the direction of a sliding touch by the user.

In one aspect, a method for displaying information of a communication terminal comprising a touch screen, comprises: displaying information on a certain portion of the touch screen; receiving a sliding touch from the user with respect to the information being displayed; and displaying previous or subsequent information of the information is shifted to be displayed according to the sliding touch on the information.

The displaying of the information may comprise receiving and displaying the information which has been broadcast from a server via a mobile communication network.

In the displaying of the information, if the information is list information of a message reception box, previous or subsequent information, of the list information, touched according to a sliding touch by the user may be shifted to be displayed.

In the shifting and displaying of the information, the displayed information may be shifted in units of titles and themes according to the direction of the sliding touch by the user and the shifted previous or subsequent information may be displayed.

In the shifting and displaying of the information, when the information is shifted to display the previous or subsequent information, an amount of remaining information that has not been displayed yet may be displayed.

In the shifting and displaying of the information, a scroll speed of the information being shifted may be adjusted according to the speed of the sliding touch speed by the user to display the information.

In the shifting and displaying of the information, associated content of the touched information may be displayed according to a touch input by the user with respect to the information.

In the shifting and displaying of the information, a URL address linked to the touched information may be connected, a screen image for searching the touched information may be provided, or detailed information of the touched information may be displayed, according to the touch input by the user with respect to the information.

In another aspect, a terminal for displaying information comprises: a communication unit that receives information broadcast from a server via a mobile communication network; a touch device that displays the received information on a certain portion thereof and receives a sliding touch from the user with respect to the displayed information; and a controller that shifts and displays previous or subsequent information of the information according to the sliding touch with respect to the information.

The controller may shift the displayed information in units of titles or themes according to the sliding touch by the user, and display the shifted previous or subsequent information.

BRIEF DESCRIPTION OF THE DRAWINGS

The implementation of this document will be described in detail with reference to the following drawings in which like numerals refer to like elements.

DETAILED DESCRIPTION

Figure 1:
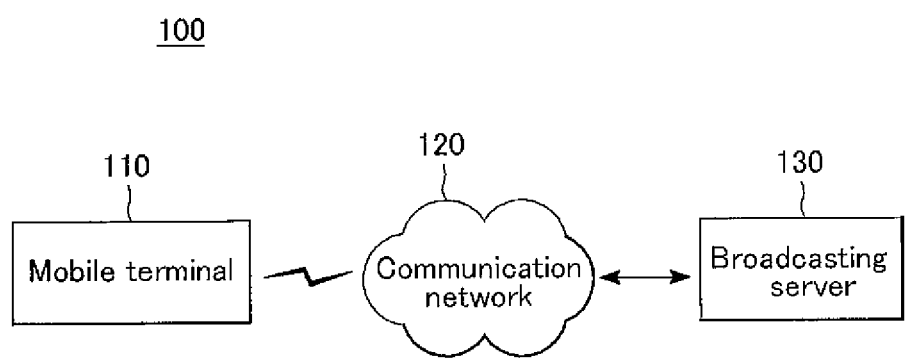
FIG. 1 is a block diagram illustrating a configuration of a communication system to which this document is applied.

Hereinafter, an implementation of this document will be described in detail with reference to the attached drawings.

In applying reference numerals to elements, it should be noted that the same reference numerals are used for the same elements as possible although they come on different drawings.

In describing the present invention, if a detailed explanation for a related known function or construction is considered to unnecessarily divert the gist of the present invention, such explanation will be omitted but would be understood by those skilled in the art.

FIG. 1 is a block diagram illustrating a configuration of a communication system employing an information display method according to an embodiment of the present invention.

The communication system 100 according to the present invention may comprise a mobile terminal 110, a communication network 120, and a broadcasting server 130.

The mobile terminal 110 may comprise a touch device such as a touch screen, a touch pad, or the like.

The mobile terminal 110 may receive information such as a news item or weather, etc., which has been broadcast from the broadcasting server 130, and display the received information on the touch device in a scrolling manner.

When a sliding touch is inputted by the user while the mobile terminal 110 is displaying the information on the touch device in the scrolling manner, content of the information may be shifted in the direction of the sliding touch to display previous or subsequent information of the scroll-displayed information.

The communication network 120 may provide a transmission path to allow the information, which has been sent from the broadcast server 130, to be transmitted to the mobile terminal 110 therethrough. Here, the communication network 130 may comprise a CDMA (Code Division Multiple Access) or GSM (Global System for the Mobile communication) mobile communication network.

The broadcasting server 130 may have (own or hold) information regarding weather, news items, fortune, show business news items, stocks, economy, events, etc., or receive these pieces of information from a pertinent server to broadcast the same to communication terminals such as the mobile terminal 110 via the communication network 120. Here, the broadcasting server 130 may comprise a TDMB (Terrestrial Digital Multimedia Broadcasting server or an SDMB (Satellite DMB) server.

Figure 2:
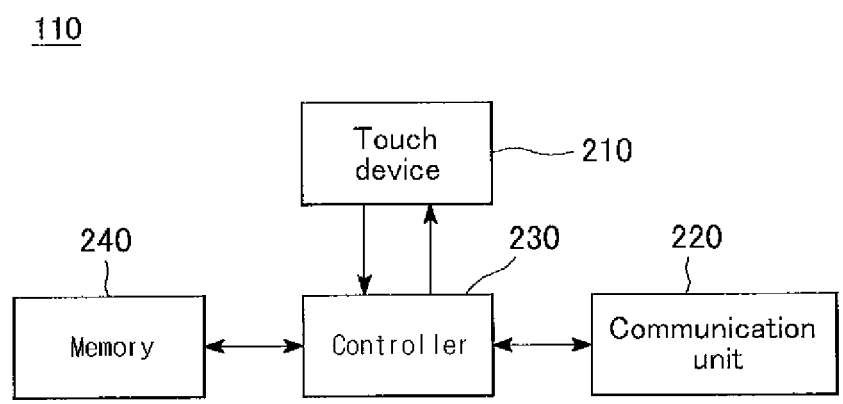
FIG. 2 is a schematic block diagram illustrating an internal configuration of a mobile terminal as an information display terminal to which this document is applied.

FIG. 2 is a schematic block diagram illustrating an internal configuration of the mobile terminal as an information display terminal according to the embodiment of the present invention.

The mobile terminal 110 according to the embodiment of the present invention may comprise a touch device 210, a communication unit 220, a controller 230, and a memory 240.

The touch device 110 may comprise an indicator area, a display area, an input area, and a control area.

The touch device 110 may receive information in a touch manner, or display the received information. In addition, the touch device 110 may display an execution result of an application. In this case, the information may comprise numbers, symbols, figures, images, audio, or video, etc.

In addition, the touch device 210 may receive information or a manipulation command from the user through the input area and transfers the same to the controller 230. In addition, the touch device 210 may scroll-display the received information on the display area or scroll-display previous or subsequent information shifted according to the sliding touch by the user.

The communication unit 220 may transmit or receive voice (audio) signals or data regarding multimedia when the mobile terminal 110 performs call communication with a different mobile terminal via a mobile communication network. In addition, the communication unit 220 may receive information broadcast from the broadcasting server 130 via the communication network 120. Here, the broadcast information may comprise information regarding weather, news items, show business, fortune, stocks, economy, or events, etc.

The controller 230 may recognize information, namely, a contour lined by joining touched points, transferred from the touch device 210 and display the same on the display area of the touch device 210.

In addition, the controller 230 may receive information through the input area from the user and display the same on the display area, or perform a controlling operation regarding a function and an operation through the control area.

The controller 230 may control such that the information received via the communication unit 220 is scroll-displayed on the touch device 210.

When a sliding touch is inputted by the user with respect to the information being scroll-displayed on the touch device 210, the controller 230 may control such that the previous information or subsequent information of the displayed information is shifted in the direction of the sliding touch so as to be displayed. Here, the sliding touch may comprise a dragging operation performed by the user while the user is touching the touch device 210.

The memory 240 may store the information received via the communication unit 210. In this case, the memory 240 may store the received information in units of titles or themes.

The memory 240 may store a program for shifting the information in the direction of the sliding touch to display the previous or subsequent information when the sliding touch is inputted by the user with respect to the information being scroll-displayed.

In addition, The memory 240 may store a program for stopping scrolled information to display the same when one-time touch with respect to the information is inputted by the user while the information is being scroll displayed, and displaying detailed information of touched information as a pop-up screen image when two-time touch with respect to the information is inputted by the user. In addition, The memory 240 may also store a general OS (Operation System) program.

Figure 3:
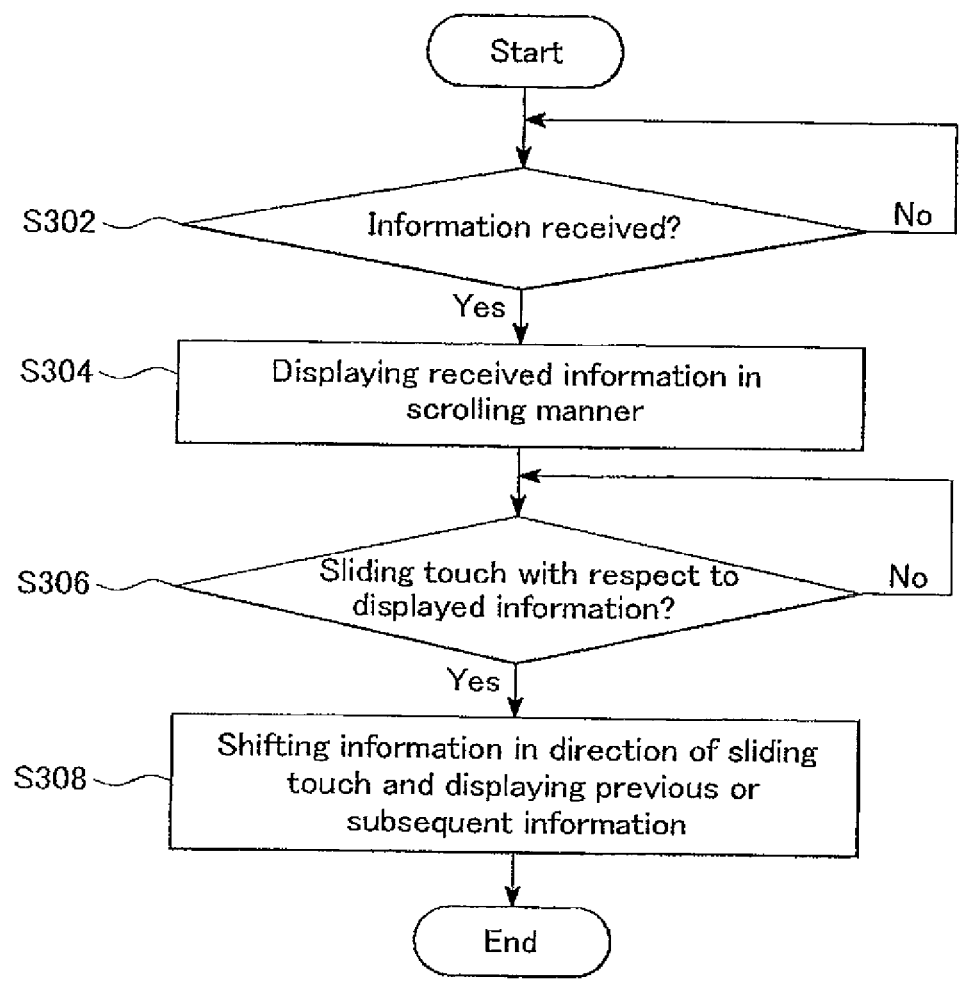
FIG. 3 is a flow chart illustrating the process of a method for displaying information to which this document is applied.

FIG. 3 is a flow chart illustrating the process of a method for displaying information according to the embodiment of the present invention.

With reference to FIG. 3, the broadcasting server 130 may broadcast information such as new items or weather, etc., to mobile terminals 110 of unspecified persons via the communication network 120. In this case, the information broadcast from the broadcasting server 130 may comprise information in the text format.

The information broadcast from the broadcasting server 130 may he transmitted to the mobile terminal 110 via the communication network 120, and the mobile terminal 110 receives the information through the communication unit 220 (S302).

Upon receiving the information, which has been broadcast from the broadcasting server 130, through the communication unit 220, the controller 230 of the mobile terminal 110 may store the received information in the memory 240, read the information in units of titles or themes from the memory 240, and scroll-display the same on a certain portion of the touch device 210 (S304).

Figure 4:
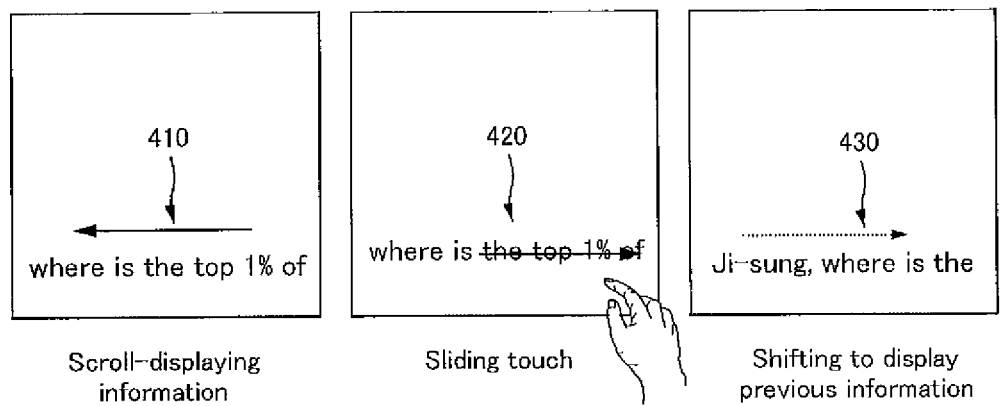
FIG. 4 is a view illustrating screen images in which previous information of a currently scrolled information is shifted to be displayed according to a sliding touch by the user.

Namely, as shown in FIG. 4, the controller 230 displays the received information on a lower end portion of the touch device 210 in the scrolling manner 410 that flows from right to left. FIG. 4 is a view illustrating screen images in which previous information of currently scrolled information is shifted to be displayed according to a sliding touch by the user.

In addition, the controller 230 may scroll-display received information in the text format on an upper end portion of the touch device 210, or may display the same in the scrolling manner that flows from left to right.

Accordingly, checking the information being scroll-displayed on the lower end portion of the touch device 210, when the user is curious about previous information which has been already scrolled from right to left, as illustrated in FIG. 4, he may put his finger on the currently scrolled information and drag it from left to right, namely, in the opposite direction of the information scroll direction, and input a sliding touch 420. Alternatively, the sliding touch may be applied to a portion of the touch screen other than the portion that is displaying scrolled information.

When the sliding touch is inputted with respect to the information being scroll-displayed on the certain area of the touch device 210 (S306—Yes), the controller 230 may shift the information being scroll-displayed on the certain area of the touch device 210 in the direction of the sliding touch to display the previous information 430 which has been already scrolled (S308).

In this case, when the information being scroll-displayed on the touch device 210 is shifted to be displayed in the direction of the sliding touch, the controller 230 may display the previous information, which has been shifted, in units of titles or themes.

Figure 5:
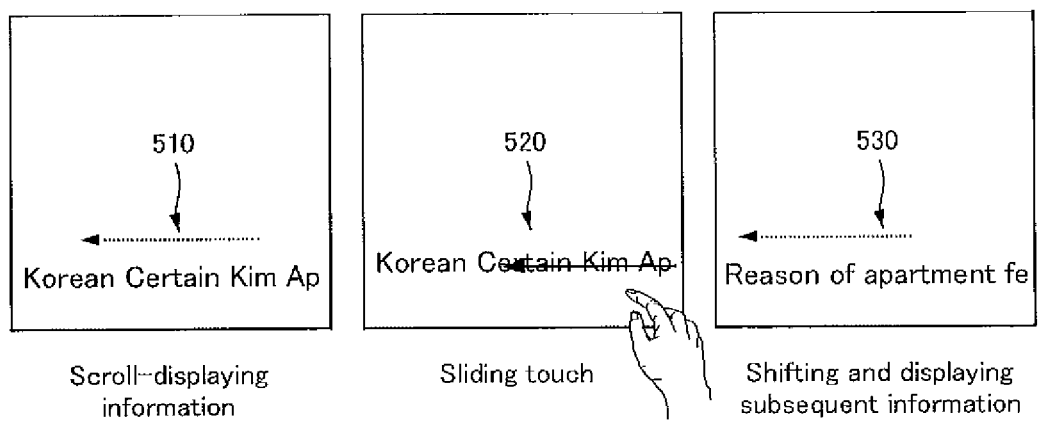
FIG. 5 is a view illustrating screen images in which subsequent information of a currently scrolled information is shifted to be displayed according to a sliding touch by the user.

If the user inputs a sliding touch 520 with respect to information 510 being scrolled from right to left on a certain portion of the touch device 210 by dragging the information 510 from right to left, namely, in the same direction as the scroll direction, as shown in FIG. 5, the controller 230 may shift the information being scroll-displayed on the certain portion of the touch device 210 from right to left, namely, in the direction of the sliding touch, to display information 530 that follows the currently scroll-displayed information. FIG. 5 is a view illustrating screen images in which the subsequent information of the currently scrolled information is shifted to be displayed according to the sliding touch by the user.

In addition, when the information being scroll-displayed on the touch device 210 is shifted to be displayed in the direction of the sliding touch, the controller 230 may shift the information in units of titles or themes and then display the same.

The previous examples have been in the context of a horizontally scrolling screen. However, the screen may scroll vertically or diagonally. If the screen is scrolled vertically, the sliding touches described above will all slide vertically, both with and against the direction of scrolling.

Figure 6:
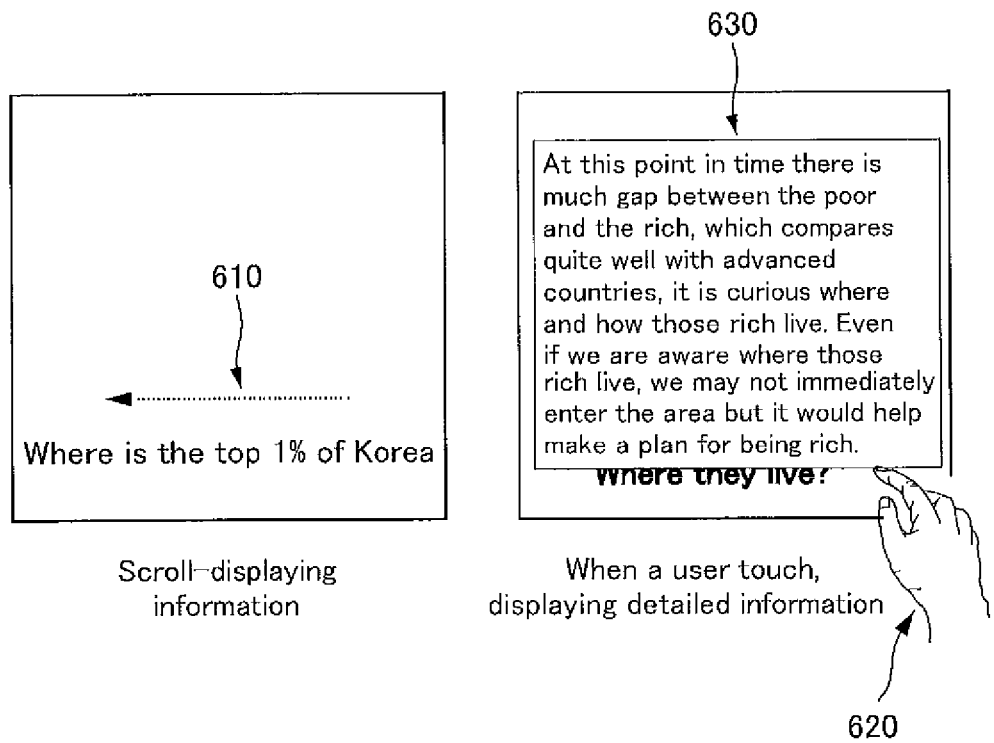
FIG. 6 is a view illustrating screen images in which when the user touches the scroll-displayed information, its detailed information is displayed as a pop-up image.

With reference to FIG. 6, when a user touch 620 is inputted with respect to information 610 being scroll-displayed from right to left on a lower end portion of the touch device 210, the controller 230 may display detailed information of the currently scroll-displayed information as touched in the form of a pop-up image 630. FIG. 6 is a view illustrating screen images in which when the user touches the scroll-displayed information, its detailed information is displayed as the pop-up image. Here, when the user touches the scrolled information, the controller 230 may change the screen to provide the detailed information of the touched information, thus displaying the detailed information on the entire screen of the touch device 210.

In addition, when a user touch 620 is inputted with respect to the information being scroll-displayed from right to left on the touch device 210, the controller 230 may display associated content of the touched information, may perform connection to a URL address to which the detailed information of the corresponding scroll-displayed information is linked, or may provide a dictionary function to search information content selected by the user touch.

Meanwhile, with reference to FIG. 4, when the sliding touch 420 dragged from left to right, namely, in the opposite direction of the scroll direction, is inputted with respect to the information 410 being scroll-displayed from right to left on the touch device 210, the controller 230 may shift the information, which is being scroll-displayed from right to left on the touch device 210, from left to right, namely, in the same direction as the direction of the sliding touch, so as to be displayed on the screen. Here, if the speed of the sliding touch by the user becomes fast, the controller 230 may shift and display the information on the screen more quickly according to the speed of the sliding touch. Thus, the software may correlate a sliding touch speed with a display speed/amount.

Alternatively, a scroll distance/amount within the information may vary in accordance with the speed of the sliding touch. Alternatively, a scroll speed or distance may vary with the length of the sliding touch, an angle of the sliding touch, or in accordance with where the sliding touch is applied on the touch screen. Also, the sliding touch may be in a shape other than a straight line (e.g., a check mark, a spiral, a random squiggly line, or another shape).

Also, with reference to FIG. 4, when the sliding touch 420 from left to right, namely, in the opposite direction of the scroll direction, is inputted with respect to the information 410 being scroll-displayed from right to left on the touch device 210, the controller 230 may reduce the scroll speed of the information, which is being scroll-displayed from right to left on the touch device 210, so as to be scroll-displayed more slowly than the previous scroll speed.

In addition, with reference to FIG. 5, when the sliding touch 520 by the user dragged from right to left, namely, in the same direction as the scroll direction, is inputted with respect to the information 510 being scroll-displayed from right to left on the touch device 210, the scroll speed of the information being scroll-displayed from right to left on the touch device 210 may become faster so that the information can be scroll-displayed at a higher speed than the previous scroll speed. Here, when the speed of the sliding touch is slow, the controller 230 may control such that the scroll speed of the information being scrolled from right to left becomes slow for display, or when the speed of the sliding touch is fast, the controller 230 may control such that the scroll speed of the information being scrolled from right to left becomes fast for display. In this manner, the controller 230 can adjust the scroll speed of the information being scrolled according to the speed of the sliding touch by the user.

In addition, in displaying list information of a message reception box on the touch device 210, the controller 230 may display content of the corresponding list information, among multiple list information, where a cursor is positioned such that the content is scroll-displayed from right to left. In this case, according to a sliding touch by the user, information immediately before or immediately after the touched list information may be shifted to be displayed.

Figure 7:
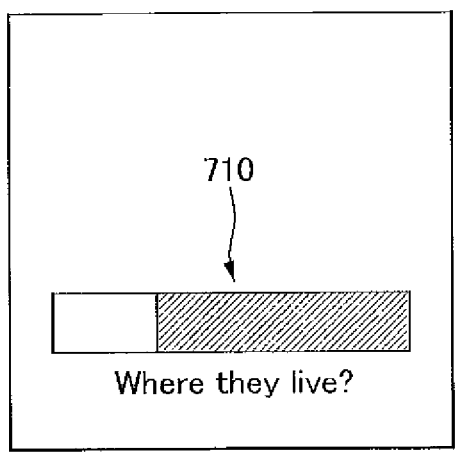
FIG. 7 is a view illustrating a screen image displaying an amount of remaining information in displaying the previous or subsequent information.

As illustrated in FIG. 7, in displaying previous or subsequent information by shifting current information scroll-displayed on the certain portion of the touch device 210, the controller 230 may indicate (display) a remaining amount of information 710, which is yet to be displayed on the display area currently seen by the user. This display may be in a bar shape or in a certain color. Other types of remaining content displays may be used (e.g., a variable height basket or water bucket, a series of highlighted and unhighlighted objects, a numeric display showing a changing percent, a pie chart, a numeric 'speedometer' display showing a changing percent, etc. FIG. 7 is a view illustrating a screen image displaying an amount of remaining information in displaying the previous or subsequent information.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

As afore-mentioned, the present invention includes a method, computer program product and terminal for displaying information whereby when the information broadcast from the broadcasting server is received and displayed in the scrolling manner, previous or subsequent information of the information being currently scroll-displayed can be shifted and displayed in the direction of the sliding touch.

The foregoing embodiments and advantages are merely exemplary and are not to be construed as limiting the present invention.

It will be apparent to those skilled in the art that various modifications and variation can be made in the present invention without departing from the spirit or scope of the invention.

Thus, it is intended that the present invention cover the modifications and variations of this invention provided they come within the scope of the appended claims and their equivalents.

As described above, the terminal and method for displaying information according to the embodiments of the present invention have such advantages that previous or subsequent information of information being scroll-displayed on the touch screen can be easily checked according to sliding touch by the user.

In addition, when the user wants to check previous or subsequent information of the information being scroll-displayed on the touch screen, he does not need to wait for until the corresponding content is scrolled back, namely, until the corresponding content is scrolled-displayed again, so the user convenience can be considerably improved.

What is claimed is:

1. A method for displaying information on a communication terminal comprising a touch screen, the method comprising:
    scrolling, by the communication terminal, information across a predefined portion of the touch screen;
    detecting, by the communication terminal, a sliding touch on the predefined portion of the touch screen; and
    displaying, by the communication terminal, data on the predefined portion of the touch screen in units of previous or subsequent information of the scrolling information according to a direction of the sliding touch such that the previous information is displayed in response to a left-to-right sliding touch and the subsequent information is displayed in response to a right-to-left sliding touch, including adjusting a scroll speed of the scrolling information according to a speed of the sliding touch.

2. The method of claim 1, wherein the step of scrolling comprises:
    receiving and buffering the information as broadcast information that has been broadcast from a server via a mobile communication network.

3. The method of claim 1, wherein, in the step of scrolling, if the scrolling information is list information corresponding to a message reception box, the previous or subsequent information is previous or displayed list information.

4. The method of claim 1, wherein the step of displaying comprises displaying information shifted in units of titles or themes.

5. The method of claim 1, wherein the step of displaying comprises:
    displaying an amount of remaining information which is yet to be displayed.

6. The method of claim 1, wherein the step of displaying comprises:
    adjusting a scroll distance of the information being shifted according to a speed of the sliding touch speed.

7. The method of claim 1, wherein the step of displaying comprises:
    displaying associated content of the scrolling information.

8. The method of claim 1, wherein the step of displaying comprises:
    displaying a URL address corresponding to the scrolling information.

9. The method of claim 1, wherein the step of detecting a sliding touch comprises detecting the sliding touch on the predefined portion.

10. A terminal for displaying information, comprising:
    a receiver configured to receive information broadcast from a server via a mobile communication network;
    a touch sensitive display device; and
    a controller configured to cause the touch sensitive display device to display the received information as scrolling information on a predefined portion of the touch sensitive display device, to detect a sliding touch on the predefined portion of the touch screen, and to display data on the predefined portion of the touch screen in units of previous or subsequent information of the scrolling information in response to the sliding touch such that the previous information is displayed in response to a left-to-right sliding touch and the subsequent information is displayed in response to a right-to-left sliding touch, including adjusting a scroll speed of the scrolling information according to a speed of the sliding touch,
    wherein the scrolling information comprises information flowing from right-to-left.

11. The terminal of claim 10, wherein the controller is configured to shift the scrolling information in units of titles or themes.

12. The terminal of claim 10, wherein the controller is configured to adjust a scroll distance of the information being shifted according to a speed of the sliding touch.

13. The terminal of claim 10, wherein the touch sensitive display device is configured to detect the sliding touch on the predefined portion.

14. The terminal of claim 10, wherein the controller is configured to cause the touch sensitive display device to display an amount of remaining information which is yet to be displayed.

15. The method of claim 1, further comprising:
    stopping the scrolling of the information if the communication terminal detects a one-time touch on the predefined portion of the touch screen.

16. The method of claim 1, further comprising:
    stopping the step of scrolling and then displaying detailed information of the information if the communication terminal detects a two-time touch on the predefined portion of the touch screen.

17. The terminal of claim 10, wherein the controller is configured to stop the scrolling information if the controller detects a one-time touch on the predefined portion of the touch screen.

18. The terminal of claim 10, wherein the controller is configured to stop the scrolling information and then display detailed information of the information if the controller detects a two-time touch on the predefined portion of the touch screen.

19. The method of claim 1, wherein the previous information displayed in response to the left-to-right sliding touch and the subsequent information displayed in response to the right-to-left sliding touch is scrolled in units of title or theme.

20. The terminal of claim 10, wherein the previous information displayed in response to the left-to-right sliding touch and the subsequent information displayed in response to the right-to-left sliding touch is scrolled in units of title or theme.

21. A method for displaying information on a communication terminal comprising a touch screen, the method comprising:

scrolling, by the communication terminal, information across a predefined portion of the touch screen;

detecting, by the communication terminal, a sliding touch on the predefined portion of the touch screen; and displaying, by the communication terminal, data on the predefined portion of the touch screen according to a direction of the sliding touch such that the previous information is displayed in response to a left-to-right sliding touch and the subsequent information is displayed in response to a right-to-left sliding touch, including adjusting a scroll speed of the scrolling according to a speed of the sliding touch, wherein the scrolling comprises information flowing from right-to left.

22. The method of claim 21, wherein, in the step of scrolling, if the scrolling information is list information, the previous or subsequent information is previous or displayed list information.

23. The method of claim 22, wherein the step of displaying further comprises:

displaying, on an entire screen of the touch screen, detail information of currently scroll-displayed information when touched.

24. The method of claim 21, wherein, in the step of displaying, when the speed of the sliding touch is slower than the scroll speed, the information is scroll-displayed at a reduced scroll speed, and when the speed of the sliding touch is faster than the scroll speed, the information is scroll-displayed at an increased scroll speed.

25. The method of claim 21, wherein the step of scrolling comprises:

receiving and buffering the information that has been received from a server via a mobile communication network.

\* \* \* \* \*